J. P. CALLAHAN.
SIDE WING AND SUNSHADE SUPPORTING BRACKET.
APPLICATION FILED OCT. 24, 1921.
1,433,934.
Patented Oct. 31, 1922.
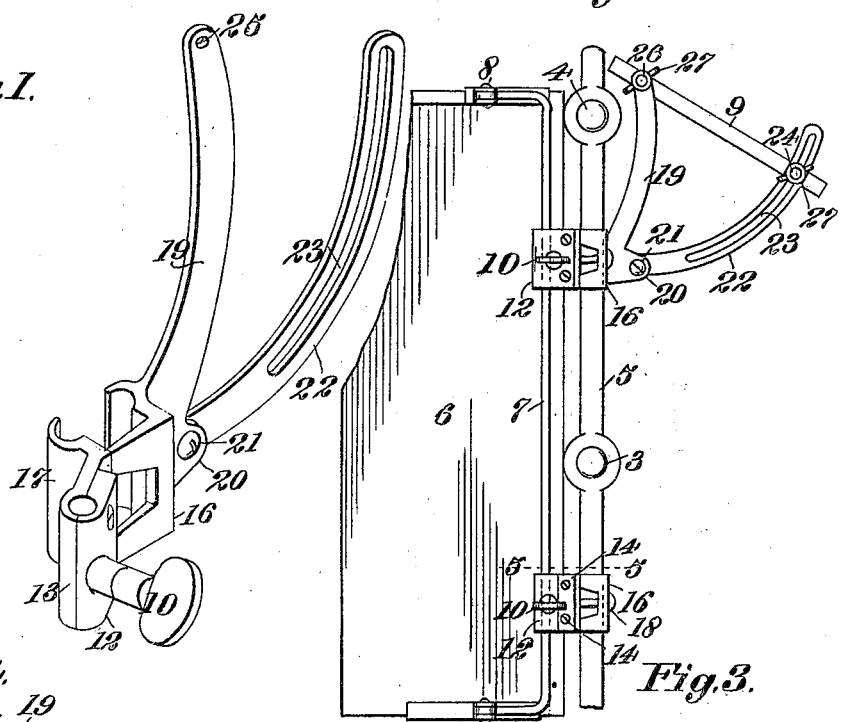
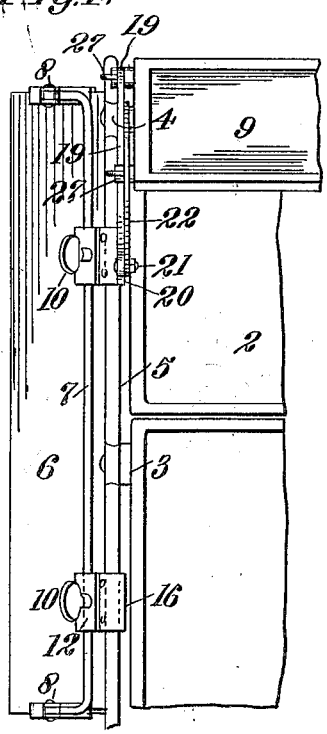
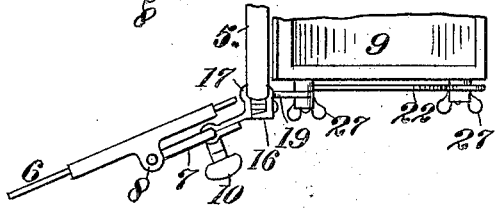
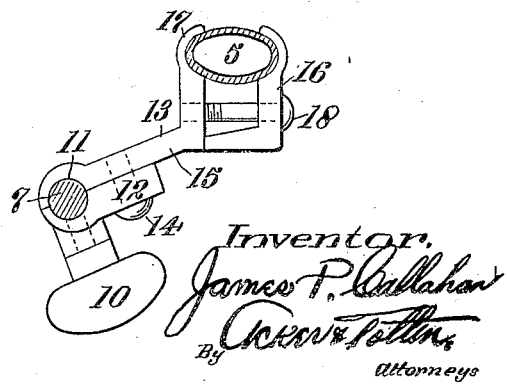
Inventor,
James P. Callahan
By Acker & Potter
Attorneys Patented Oct. 31, 1922.

1,433,934

UNITED STATES PATENT OFFICE.

JAMES P. CALLAHAN, OF SAN FRANCISCO, CALIFORNIA.

SIDE-WING AND SUNSHADE SUPPORTING BRACKET.

Application filed October 24, 1921. Serial No. 509,834.

*To all whom it may concern:*

Be it known that I, JAMES P. CALLAHAN, a citizen of the United States, residing at the city and county of San Francisco and State of California, have invented certain new and useful Improvements in Side-Wing and Sunshade Supporting Brackets, of which the following is a specification.

It is often desirable to equip an automobile with the well known side shields or deflectors and a sunshade, and which is often found difficult as the two are in most instances supported on the wind shield standards, and as each heretofore has required a separate bracket, the difficulty has been encountered in securing the brackets to the standards due to the little space afforded.

The present invention relates to a bracket adapted for mounting on a side shield and also for supporting one end of a sunshade, and due to the single clamping or point of securing of the bracket to the wind shield standard, the bracket is adapted for universal use, as but little space is required for the attachment of the same to the standard.

The principal objects of this invention are to provide a bracket adapted for supporting a side shield and one end of a sunshade, one whereby adjustment for the sunshade is afforded, and one whereby the sunshade and side shield are capable of independent adjustment.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein:—

Figure 1 is a view in perspective of the preferred embodiment of my invention removed from a wind shield standard.

Figure 2 is a view in end elevation of a vehicle wind shield illustrating my bracket supporting the upper end of a side shield and one end of a sunshade.

Figure 3 is a view in top plan of the end portion of the wind shield illustrated in Figure 2.

Figure 4 is a view in front elevation of the end portion of the wind shield illustrated in Figure 2, and Figure 5 is a sectional view on line 5—5 of Figure 2 illustrating the lower side shield bracket, which is of the well known form.

In the drawings, wherein like characters of reference designate corresponding parts, the numerals 1 and 2 indicate respectively the lower and upper main wind shield sections respectively pivoted as at 3 and 4 at one end to one of the wind shield standards 5, which preferably extends upwardly from the vehicle body, not shown. A conventional transparent side shield 6 is illustrated as positioned at one side of the main wind shield, and the same mounts a supporting rod 7, pivoted as at 8 to the opposite ends of the shield as in the drawing.

Transversely of the main wind shield with its upper edge disposed parallel to the upper main wind shield section is a sunshade 9, and it is for the convenient mounting of the side shield 6 and one end of the sunshade 9 that my present invention has been designed.

The lower end of the rod 7 is clamped by a set screw 10 within a bearing opening 11 through which said rod extends, the bearing opening being formed by the co-operating parts 12 of a bracket 13, the parts 12 being normally and detachably secured together by screws or retaining members 14. A bracket 13 in turn is formed in two parts, the main part 15 and the auxiliary clamp 16, one end of the main part 15 being disposed at an angle of approximately 45 degrees from the main part 15, affording a clamping foot 17, which is adapted to lie parallel with the clamping member 17, the two being drawn together to engage around the standard 5 by suitable adjusting screws 18.

The description of this bracket briefly sets forth my present form of bracket illustrated and claimed in application for Letters Patent Serial No. 299,872, filed May 26th, 1919, and which bracket is employed to secure the lower end of the side shield to the standard 5.

This same bracket is utilized for securing the upper end of the side shield 6 to the standard 5 and one end of the sunshade thereto, the clamping member 16 thereof having outwardly and upwardly extended therefrom an arm 19, and also being formed in a plane parallel with the lower end of the arm 19 with an ear 20, which pivotally mounts, through a fulcrum pin 21, the inner end of an arcuate part 22 slotted as at 23, and adapted for receiving a lug or pin 24 projecting outwardly from one end of the sunshade 9. The upper end of arm 19 is also provided with an opening 25 for receiving a fulcrum pin 26 projecting from the upper edge of the sunshade 9, said pins 24 and 26 each mounting a wing nut 27 of the conventional type.

It will be apparent that in the single bracket for securing to the upper portion of the wind shield standard 5, I provide a means for mounting a side shield in rear of the main wind shield, and a means for supporting one end of a sunshade in advance of the upper portion of the wind shield.

Having thus described my invention what I claim as new and desire to secure by Letters Patent of the United States is:—

1. A bracket for securing a side shield and one end of a sunshade to a main wind shield support comprising a member consisting of two main portions, one provided with a lateral clamping portion for mounting a side shield and the other provided with an upwardly extended arm affording a fulcrum and support for a sunshade, and means for clamping the main portions to a support.

2. A bracket for securing a side shield and one end of a sunshade to a main wind shield support comprising a member consisting of two main portions, one provided with a lateral clamping portion for mounting a side shield and the other provided with an upwardly extended arm affording a fulcrum and support for a sunshade, means for clamping the main portions to a support, and a part pivotally mounted at one end on one of said main portions to extend beyond said arm, said part adapted for co-operation with the sunshade near its free edge affording a brace therefor.

3. A bracket for securing a side shield and one end of a sunshade to a main wind shield, the same comprising a member consisting of two co-operating main portions, means for clamping the same in engagement with a wind shield standard, one of said portions provided with a divided clamp inclined laterally therefrom for engaging and supporting a side shield, an arm extended upwardly from said other main portion providing a fulcrum and support for the sunshade, and a part pivotally secured to said arm carrying portion for co-operating with the free end of the sunshade for retaining the same in its adjusted position.

4. A bracket for securing a side shield and one end of a sunshade to a main wind shield, the same consisting of a body formed with a divided clamp extended laterally at an incline from the rear thereof for engaging and supporting a side shield, one portion of said clamp being integral with said body, said body being also formed with an integral arm extending upwardly from the forward portion thereof providing a fulcrum and support for the sunshade, and means for detachably securing said body to a permanent wind shield element with said clamp extended rearwardly from the element and the arm forwardly thereof.

5. A bracket for securing a side shield and one end of a sunshade to a main wind shield, the same consisting of a body formed with a divided clamp extended laterally at an incline from the rear thereof for engaging and supporting a side shield, said body being also formed with an arm extending upwardly from the forward portion thereof providing a fulcrum and support for the sunshade, and means for detachably securing said body to a permanent wind shield element with said clamp and arm disposed one on each side thereof.

6. A bracket for securing a side shield and one end of a sunshade to a main wind shield, the same consisting of a body, means for securing said body to a permanent wind shield element, means extended from said body affording a support for a side shield in rear of said permanent wind shield element, and an arm extended upwardly and forwardly from said body for affording a support and fulcrum for one end of a vehicle sunshade.

In testimony whereof I have signed my name to this specification.

JAMES P. CALLAHAN.